United States Patent
Dingli

(10) Patent No.: US 12,287,212 B2
(45) Date of Patent: Apr. 29, 2025

(54) USER PREVIEW OF THE INTERIOR

(71) Applicant: Pony AI Inc., Grand Cayman (KY)

(72) Inventor: Robert Dingli, Cupertino, CA (US)

(73) Assignee: Pony AI Inc., Grand Cayman (KY)

( * ) Notice: Subject to any disclaimer, the term of this patent is extended or adjusted under 35 U.S.C. 154(b) by 157 days.

(21) Appl. No.: 18/159,063

(22) Filed: Jan. 24, 2023

(65) Prior Publication Data

US 2023/0160704 A1    May 25, 2023

Related U.S. Application Data

(63) Continuation of application No. 16/666,298, filed on Oct. 28, 2019, now Pat. No. 11,561,106.

(51) Int. Cl.
| | |
|---|---|
| *G01C 21/34* | (2006.01) |
| *G06Q 10/02* | (2012.01) |
| *H04N 5/28* | (2006.01) |
| *H04N 7/18* | (2006.01) |

(52) U.S. Cl.
CPC ......... *G01C 21/3438* (2013.01); *G06Q 10/02* (2013.01); *H04N 7/18* (2013.01); *H04N 5/28* (2013.01)

(58) Field of Classification Search
CPC .... G01C 21/3438; G06Q 10/02; G06Q 10/06; G06Q 50/30; H04N 7/18
USPC ....................................................... 701/410
See application file for complete search history.

(56) References Cited

U.S. PATENT DOCUMENTS

| | | | |
|---|---|---|---|
| 10,692,371 B1* | 6/2020 | Nix ...................... G07C 5/008 |
| 2014/0222298 A1* | 8/2014 | Gurin ................... G06Q 10/08 |
| | | | 701/49 |
| 2015/0204684 A1* | 7/2015 | Rostamian ......... G06Q 10/0631 |
| | | | 701/537 |
| 2016/0364678 A1* | 12/2016 | Cao ..................... G06Q 10/083 |
| 2017/0284819 A1* | 10/2017 | Donnelly .............. B60R 16/037 |
| 2018/0260787 A1* | 9/2018 | Xi ....................... G06Q 10/1095 |
| 2019/0197325 A1* | 6/2019 | Reiley ............... G08B 13/19602 |
| 2019/0317526 A1* | 10/2019 | Goldman ............. G05D 1/0297 |
| 2019/0376805 A1* | 12/2019 | Whitt ..................... G07C 5/004 |
| 2020/0005059 A1* | 1/2020 | Yamada ................. G08B 21/24 |
| 2020/0064146 A1* | 2/2020 | Kitajima ............ G01C 21/3608 |
| 2020/0133306 A1* | 4/2020 | Chadha ................ G05D 1/0088 |
| 2020/0226707 A1* | 7/2020 | Tachibana .............. G06Q 50/40 |
| 2020/0238953 A1* | 7/2020 | Spasovski .............. G06V 20/59 |
| 2020/0249042 A1* | 8/2020 | Warr ................... G01C 21/3438 |

(Continued)

*Primary Examiner* — Krishnan Ramesh
(74) *Attorney, Agent, or Firm* — Sheppard, Mullin, Richter & Hampton LLP; Xin Xie

(57) ABSTRACT

Provided herein is a system on a vehicle, the system comprising one or more sensors, one or more processors, and a memory storing instructions that, when executed by the one or more processors, causes the system to perform: receiving one or more ride requests for ridesharing from one or more users; receiving respective preferences from each of the one or more users; selecting a ride request of a user from the one or more ride requests based on the respective preferences; notifying the user of the selecting of the ride request; sending at least one of the images or videos of the interior of the vehicle to the user; in response to the sending, determining whether the user confirms the ride request; and in response to determining that the user confirms the ride request, selecting a route to the user and driving, according to the route, to the user.

12 Claims, 13 Drawing Sheets

(56) References Cited

U.S. PATENT DOCUMENTS

2020/0294173 A1* 9/2020 Shah ................ G06Q 10/02
2021/0049364 A1* 2/2021 Wang ................ H04N 7/18

* cited by examiner

251

Preferences of User 1:
Legroom: 40-42 inches
252  Seating: Leather
No smoking
Fragrance: Pumpkin or orange spice
Temperature: 60-65°F Driving Manner: Steady; smooth
253  Desired cruising velocity: 65 mph
Desired acceleration: Under $2.4 * 10^4$ mph$^2$ 254  Distance to user 1: 1.2 miles
Estimated time to user 1: 3 minutes Distance of route: 10.3 miles
255  Estimated time of route: 15 minutes
Terrain of route: Flat, 10% grade

256

Preferences of User 2:
Legroom: 38-42 inches
257  Seating: Leather
No smoking
Fragrance: None
Temperature: 55-60°F Driving Manner: Fast
258  Desired cruising velocity: 75 mph
Desired acceleration: $3.2 * 10^4$ - $4.8 * 10^4$ mph$^2$ 259  Distance to user 1: 2.7 miles
Estimated time to user 1: 8 minutes Distance of route: 5.6 miles
260  Estimated time of route: 12 minutes
Terrain of route: Mountainous, 30% grade

Preferences of User 3:
Legroom: 36-42 inches
262  Seating: Nylon
No smoking; smoking
Fragrance: Citrus; fruit
Temperature: 65-75°F 263  Driving Manner: Steady; smooth
Desired cruising velocity: 70 mph
Desired acceleration: $2.4 * 10^4$ - $3.2 * 10^4$ mph$^2$ 264  Distance to user 1: 1.9 miles
Estimated time to user 1: 8 minutes Distance of route: 3.2 miles
265  Estimated time of route: 8 minutes
Terrain of route: Rolling, 15% grade

261

Preferences of User 4:
Legroom: 38-42 inches
267  Seating: Vinyl; nylon
No smoking; smoking
Fragrance: None
Temperature: 55-65°F 268  Driving Manner: Fast
Desired cruising velocity: 75 mph
Desired acceleration: $4.0 * 10^4$ - $4.8 * 10^4$ mph$^2$ 269  Distance to user 1: 0.8 miles
Estimated time to user 1: 3 minutes Distance of route: 13.9 miles
270  Estimated time of route: 20 minutes
Terrain of route: Flat, 10% grade

Vehicle Characteristics:
      Legroom: 38 inches
        Seating: Vinyl
272      No smoking
      Fragrance: Citrus
    Temperature: 58°F                    271

Driving Manner: Fast
273  Cruising velocity: 70 mph
   Acceleration: $4 * 10^4$ $mph^2$ 274  Type of vehicle: small car
     Maximum grade: 25%
```

Confirming Engine 220

241

242

Vehicle Characteristics:
Legroom: 38 inches
Seating: Vinyl
272  No smoking
Fragrance: Citrus
Temperature: 58°F 273  Driving Manner: Fast
Cruising velocity: 70 mph
Acceleration: $4 * 10^4 \text{ mph}^2$ 274  Type of vehicle: small car
Maximum grade: 25%

271

Confirming
Engine
220

USER PREVIEW OF THE INTERIOR

CROSS REFERENCE TO RELATED APPLICATIONS

This application is a continuation of U.S. Ser. No. 16/666,298, filed Oct. 28, 2019, the content of which is incorporated by reference in its entirety into the present disclosure.

TECHNICAL FIELD

The present disclosure relates generally to vehicles such as autonomous vehicles (AVs) that provide ridesharing and taxi services. In particular, a user or customer of a ridesharing or taxi service may view an interior of the vehicle before confirming the ridesharing or taxi service. A user or customer of a ridesharing or taxi service may be matched with a taxi, such as a robotaxi, based on user preferences of an interior of the robotaxi and user preferences of a driving manner.

BACKGROUND

The high-demand ridesharing industry has helped users travel with increased convenient. For example, ridesharing is commonly utilized for first mile and last mile travelling, and travelling at locations and/or times with no other public transportation option available. Robotaxis have the potential to disrupt the ridesharing industry. According to one estimate, robotaxis would cost less than 18 cents per mile to operate, compared to 62 cents per mile for owning a vehicle and two to three dollars per mile for traditional ridesharing models. According to another estimate, the robotaxi industry will generate over $2 trillion per year by the year 2030. Currently, one drawback of ridesharing and robotaxi technologies is that the user or customer is not provided with a picture or video of an interior of a vehicle beforehand. Additionally, user preferences of a driving style or a driving manner are not considered. For example, a user with health problems may prefer a slower and steadier ride. As another example, a user in a hurry to get to a destination may prefer a ride that travels at a faster speed and having a faster acceleration. As another example, a user that needs to travel on mountainous terrain may require a vehicle suited for such travel. These shortfalls are addressed by the present disclosures, which provide an efficient and effective system and method of providing a user of a ridesharing or robotaxi service a picture and/or a video of an interior of a vehicle, and providing a user information regarding driving characteristics of the vehicle.

SUMMARY

Described herein are systems and methods for a vehicle to provide, to a user requesting a ridesharing service and matched with the vehicle, one or more images, one or more videos, and information of driving manners and an interior of the vehicle, and to confirm that the user accepts a match with the vehicle. Various embodiments of the present disclosure provide a system of a vehicle comprising: one or more sensors; one or more processors; and a memory storing instructions that, when executed by the one or more processors, causes the system to perform: receiving one or more ride requests for ridesharing from one or more users; receiving respective preferences from each of the one or more users; selecting a ride request of a user from the one or more ride requests based on the respective preferences; notifying the user of the selecting of the ride request; sending at least one of the images or videos of the interior of the vehicle to the user; in response to the sending at least one of the images or videos of the interior of the vehicle, determining whether the user confirms the ride request; and in response to determining that the user confirms the ride request, selecting a route to the user and driving, according to the route, to the user.

In some embodiments, the instructions further cause the system to perform: sending, to the user, one or more driving characteristics of the vehicle; and in response to the sending, to the user, the one or more driving characteristics of the vehicle, determining whether the user confirms the ride request.

In some embodiments, the one or more driving characteristics comprise any of: a cruising velocity of the vehicle, an acceleration rate of the vehicle, and a driving style or driving manner of the vehicle.

In some embodiments, the instructions further cause the system to perform: sending, to the user, one or more characteristics of the interior of the vehicle; and in response to the sending, to the user, the one or more characteristics of the interior of the vehicle, determining whether the user confirms the ride request.

In some embodiments, the one or more characteristics of the interior of the vehicle comprise any of: a material of upholstery, an amount of leg room, a temperature of the interior of the vehicle, and a smell of the interior of the vehicle.

In some embodiments, the instructions further cause the system to perform: in response to the determining that the user does not confirm the ride request, selecting another ride request from the one or more ride requests based on a closest match between the respective preferences and characteristics of the vehicle, the characteristics comprising one or more characteristics of the interior of the vehicle and driving characteristics of the vehicle.

In some embodiments, the selecting a ride request of a user from the one or more ride requests comprises selecting a ride request based on respective distances of the one or more ride requests, respective time durations of the one or more ride requests, or respective terrains of roads of the one or more ride requests.

In some embodiments, the instructions further cause the system to perform: in response to the receiving respective preferences from each of the one or more users, ranking each of the one or more ride requests in an order starting from a closest match between the respective preferences and characteristics of the vehicle.

In some embodiments, the selecting a ride request of a user from the one or more ride requests based on the respective preferences comprises selecting among closest matches between the respective preferences and characteristics of the vehicle.

In some embodiments, the selecting a ride request of a user from the one or more ride requests comprises selecting a ride request of a user based on a distance from the vehicle to the user.

Various embodiments of the present disclosure provide a method implemented on a vehicle by a computing system including one or more processors and storage media storing machine-readable instructions, wherein the method is performed using the one or more processors. The method may comprise: acquiring one or more images or videos, using the one or more sensors, of an interior of the vehicle; receiving one or more ride requests for ridesharing from one or more users; receiving respective preferences from each of the one or more users; selecting a ride request of a user from the one or more ride requests based on the respective preferences; notifying the user of the selecting of the ride request; sending at least one of the images or videos of the interior of the vehicle to the user; in response to the sending at least one of the images or videos of the interior of the vehicle, determining whether the user confirms the ride request; and in response to determining that the user confirms the ride request, selecting a route to the user and driving, according to the route, to the user.

In some embodiments, the method further comprises: sending, to the user, one or more driving characteristics of the vehicle; and in response to the sending, to the user, the one or more driving characteristics of the vehicle determining whether the user confirms the ride request.

In some embodiments, the one or more driving characteristics comprise any of: a cruising velocity of the vehicle, an acceleration rate of the vehicle, and a driving style or driving manner of the vehicle.

In some embodiments, the method further comprises: sending, to the user, one or more characteristics of the interior of the vehicle; and in response to the sending, to the user, the one or more characteristics of the interior of the vehicle, determining whether the user confirms the ride request.

In some embodiments, the one or more characteristics of the interior of the vehicle comprise any of: a material of upholstery, an amount of leg room, a temperature of the interior of the vehicle, and a smell of the interior of the vehicle.

In some embodiments, the method further comprises: in response to the determining that the user does not confirm the ride request, selecting another ride request from the one or more ride requests based on a closest match between the respective preferences and characteristics of the vehicle, the characteristics comprising one or more characteristics of the interior of the vehicle and driving characteristics of the vehicle.

In some embodiments, the selecting a ride request of a user from the one or more ride requests comprises selecting a ride request based on respective distances of the one or more ride requests, respective time durations of the one or more ride requests, or respective terrains of roads of the one or more ride requests.

In some embodiments, in response to the receiving respective preferences from each of the one or more users, ranking each of the one or more ride requests in an order starting from a closest match between the respective preferences and characteristics of the vehicle.

In some embodiments, the selecting a ride request of a user from the one or more ride requests based on the respective preferences comprises selecting among closest matches between the respective preferences and characteristics of the vehicle.

In some embodiments, the selecting a ride request of a user from the one or more ride requests comprises selecting a ride request of a user based on a distance from the vehicle to the user.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

In general, a vehicle (e.g., an autonomous vehicle, a driverless vehicle, etc.) can have myriad sensors onboard the vehicle. The myriad sensors can include light detection and ranging sensors (or LiDARs), radars, cameras, GPS, sonar, ultrasonic, IMU (inertial measurement unit), accelerometers, gyroscopes, magnetometers, FIR (far infrared) sensors, etc. The myriad sensors can play a central role in functioning of an autonomous or driverless vehicle. For example, LiDARs can be utilized to detect and identify objects (e.g., other vehicles, road signs, pedestrians, buildings, etc.) in a surrounding. LiDARs can also be utilized to determine relative distances of the objects in the surrounding. For another example, radars can be utilized to aid with collision avoidance, adaptive cruise control, blind side detection, assisted parking, etc. For yet another example, camera can be utilized to recognize, interpret, and/or analyze contents or visual cues of the objects. Cameras and other optical sensors can capture image data using charge coupled devices (CCDs), complementary metal oxide semiconductors (CMOS), or similar elements. An IMU may detect abnormal occurrences such as a bump or pothole in a road. Data collected from these sensors can then be processed and used, as inputs, to make driving decisions (e.g., acceleration, deceleration, direction change, etc.). For example, data from these sensors may be further processed into an image histogram of a graphical representation of tonal distribution in an image captured by the one or more sensors.

Various embodiments overcome problems specifically arising in the realm of autonomous vehicle technology. Sensors on a vehicle may assist in finding a stop point (parking spot, drop off or pick up point). In various embodiments, the myriad sensors (e.g., LiDARs, radars, cameras, etc.) onboard the autonomous vehicle can be encased or housed in an enclosure. The enclosure allows the myriad sensors to be moved from one vehicle to another vehicle in a single act, rather than to move the myriad sensors one by one. In some embodiments, the enclosure can be installed or mounted onto a fixture of the autonomous vehicle. For example, the enclosure can be installed or mounted onto a roof rack or a custom rack fitted to the autonomous vehicle. The enclosure can be translated or moved along the fixture. In some embodiments, the enclosure is made of a material that is transparent to electromagnetic waves receptive to the myriad sensors encased by the enclosure. For example, the enclosure can be made from a transparent material that allows laser lights, radio waves, and visible lights emitted and/or received by the LiDARs, the radars, and the cameras, respectively, to enter and/or exit the enclosure.

Figure 1:
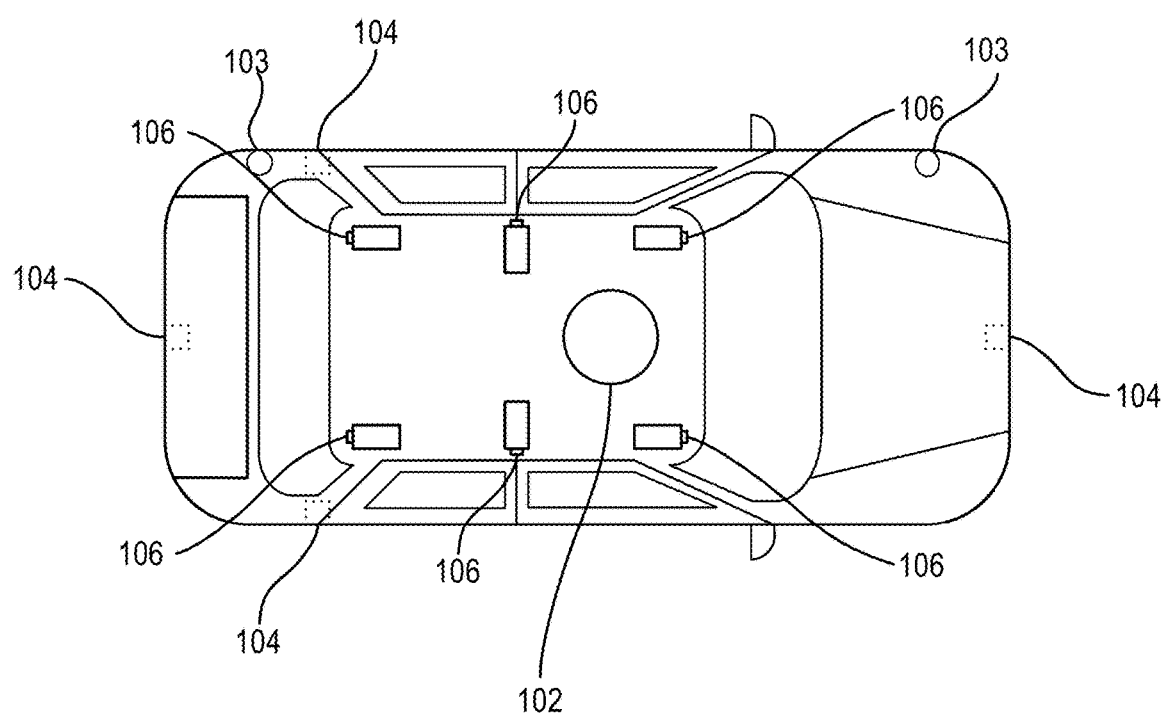
FIG. 1 illustrates an example vehicle, such as an autonomous vehicle (AV), which may be used for ridesharing or as a robotaxi, according to an embodiment of the present disclosure.

FIG. 1 illustrates an example vehicle 100 such as an autonomous vehicle, according to an embodiment of the present disclosure. A vehicle 100 generally refers to a category of vehicles that are capable of sensing and driving in a surrounding by itself. The vehicle 100 can include myriad sensors (e.g., LiDARs, radars, cameras, etc.) to detect and identify objects in the surrounding. Such objects may include, but not limited to, pedestrians, road signs, traffic lights, and/or other vehicles, for example. The vehicle 100 can also include myriad actuators to propel and navigate the vehicle 100 in the surrounding. Such actuators may include, for example, any suitable electro-mechanical devices or systems to control a throttle response, a braking action, a steering action, etc. In some embodiments, the vehicle 100 can recognize, interpret, and analyze road signs (e.g., speed limit, school zone, construction zone, etc.) and traffic lights (e.g., red light, yellow light, green light, flashing red light, etc.). For example, the vehicle 100 can adjust vehicle speed based on speed limit signs posted on roadways. In some embodiments, the vehicle 100 can determine and adjust speed at which the vehicle 100 is traveling in relation to other objects in the surroundings. For example, the vehicle 100 can maintain a constant, safe distance from a vehicle ahead (e.g., adaptive cruise control). In this example, the vehicle 100 maintains this safe distance by constantly adjusting its vehicle speed to that of the vehicle ahead.

In various embodiments, the vehicle 100 may navigate through roads, streets, and/or terrain with limited or no human input. The word "vehicle" or "vehicles" as used in this paper includes vehicles that travel on ground (e.g., cars, trucks, bus, etc.), but may also include vehicles that travel in air (e.g., drones, airplanes, helicopters, etc.), vehicles that travel on water (e.g., boats, submarines, etc.). Further, "vehicle" or "vehicles" discussed in this paper may or may not accommodate one or more passengers therein. Moreover, phrases "autonomous vehicles," "driverless vehicles," or any other vehicles that do not require active human involvement can be used interchangeably.

In general, the vehicle 100 can effectuate any control to itself that a human driver can on a conventional vehicle. For example, the vehicle 100 can accelerate, brake, turn left or right, or drive in a reverse direction just as a human driver can on the conventional vehicle. The vehicle 100 can also sense environmental conditions, gauge spatial relationships (e.g., distances between objects and itself), detect and analyze road signs just as the human driver. Moreover, the vehicle 100 can perform more complex operations, such as parallel parking, parking in a crowded parking lot, collision avoidance, etc., without any human input.

In various embodiments, the vehicle 100 may include one or more sensors. As used herein, the one or more sensors may include laser scanning systems (e.g., LiDARs) 102, ultrasonic sensors 103, radar systems 104, camera systems 106, GPS, sonar, IMU (inertial measurement unit), accelerometers, gyroscopes, magnetometers, FIR (far infrared) sensors, and/or the like. The one or more sensors allow the vehicle 100 to sense an environment around the vehicle 100. For example, the LiDARs 102 can generate a three-dimensional map of the environment. The LiDARs 102 can also detect objects in the environment. In the example of FIG. 1, the vehicle 100 is shown with four radar systems 104. Two radar systems are coupled to a front-side and a back-side of the vehicle 100, and two radar systems are coupled to a right-side and a left-side of the vehicle 100. In some embodiments, the front-side and the back-side radar systems can be configured for adaptive cruise control and/or accident avoidance. For example, the front-side radar system can be used by the vehicle 100 to maintain a healthy distance from a vehicle ahead of the vehicle 100. In another example, if the vehicle ahead experiences a sudden reduction in speed, the vehicle 100 can detect this sudden change in motion and adjust its vehicle speed accordingly. In some embodiments, the right-side and the left-side radar systems can be configured for blind-spot detection. In the example of FIG. 1, the vehicle 100 is shown with six camera systems 106 on a roof of the vehicle 100. Two camera systems are coupled to the front-side of the roof of the vehicle 100, two camera systems are coupled to the back-side of the roof of the vehicle 100, and two camera systems are coupled to the right-side and the left-side of the roof of the vehicle 100. In some embodiments, the front-side and the back-side camera systems can be configured to detect, identify, and decipher objects, such as cars, pedestrian, road signs, in the front and the back of the vehicle 100. For example, the front-side camera systems can be utilized by the vehicle 100 to determine speed limits. In some embodiments, the right-side and the left-side camera systems can be configured to detect objects, such as lane markers. For example, side camera systems can be used by the vehicle 100 to ensure that the vehicle 100 drives within its lane.

Figure 2A:
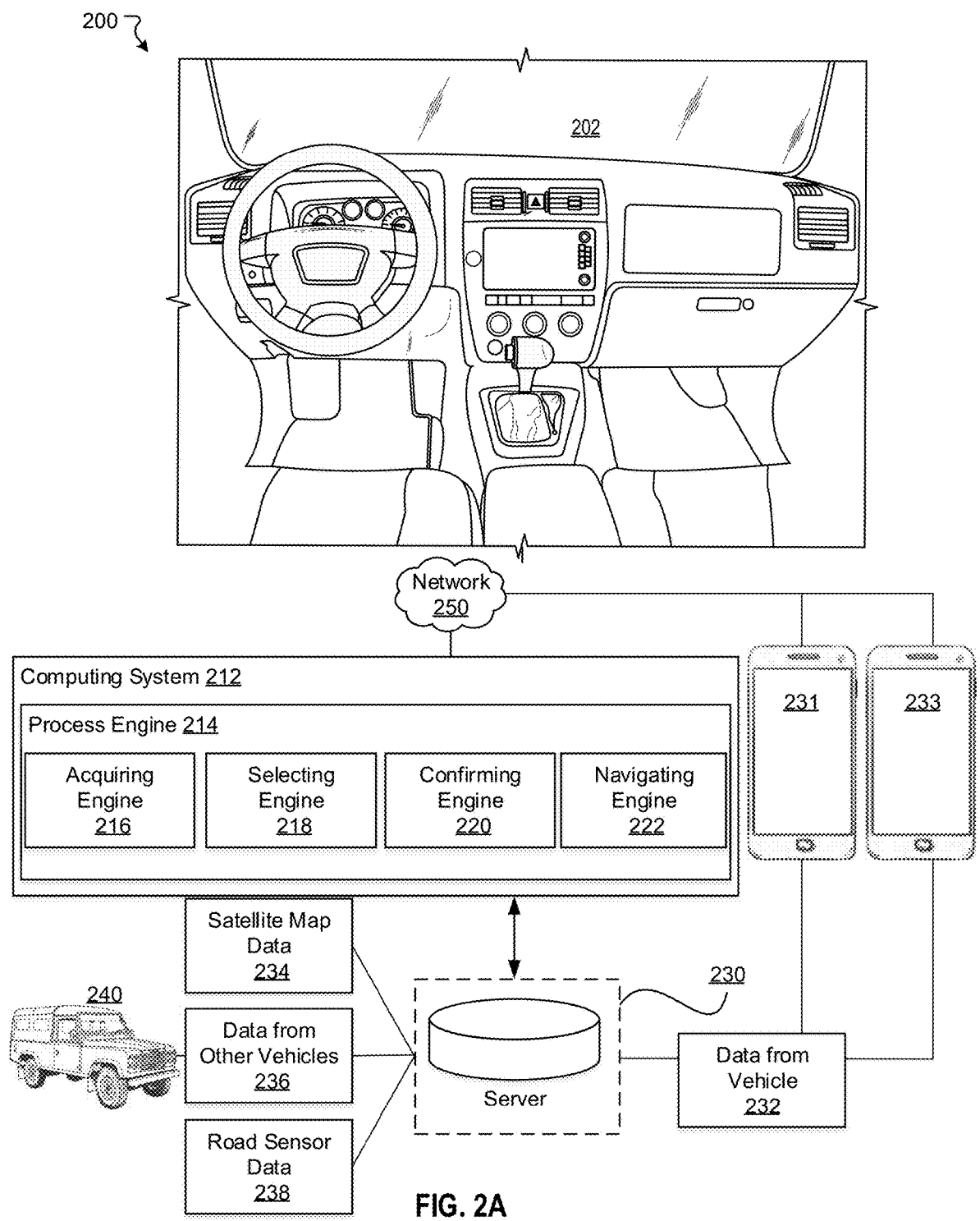
FIG. 2A illustrates an example environment of a system that coordinates or controls a ridesharing or robotaxi service, provides, to a user requesting the service, one or more images, one or more videos, and information of driving manners and an interior of the vehicle used in the service, and confirms that the user accepts a match with the vehicle, according to an embodiment of the present disclosure.

FIG. 2A illustrates an example environment 200 of a system that selectively provides information to a user of a ridesharing service or a robotaxi, and determines whether the user confirms a match with a vehicle 202, to ride the vehicle 202 to a desired destination. In various embodiments, the vehicle 202 may be implemented as vehicle 100. The vehicle 202 may utilize its sensors including LiDAR, radar, camera, GPS, and/or ultrasonic sensors, as described with respect to the vehicle 100, to obtain data. The vehicle 202 may be connected, over a network 250, to at least one computing system 212 that includes one or more processors and memory, and to a device 231. In some embodiments, the at least one computing system 212 may be physically and/or electrically connected to the vehicle 202. In some embodiments, the computing system 212 may be integrated as part of the vehicle 202. One or more users may, through a device 231 and a device 233, request, view details of, and/or confirm a ridesharing or robotaxi service. The device 231 and the device 233 may belong to different users. The processors may be configured to perform various operations by interpreting machine-readable instructions. In some embodiments, the example environment 200 may be implemented as a data platform. In some embodiments, the example environment 200 may be configured to interact with computing systems of the data platform. In various embodiments, one or more computing systems 212 of the data platform may coordinate and/or control one or more operations of a robotaxi or ridesharing service.

In some embodiments, the computing system 212 may include a process engine 214. The process engine 214 may include a acquiring engine 216, a selecting engine 218, a confirming engine 220, and a navigating engine 222. The process engine 214 may be executed by the processor(s) of the computing system 212 to perform various operations including those operations described in reference to the acquiring engine 216, the selecting engine 218, the confirming engine 220, and the performing engine 222. In general, the process engine 214 may be implemented, in whole or in part, as software that is capable of running on one or more computing devices or systems. In one example, the process engine 214 may be implemented as or within a software application running on one or more computing devices (e.g., user or client devices) and/or one or more servers (e.g., network servers or cloud servers, servers 230). In some instances, various aspects of the acquiring engine 216, the selecting engine 218, the confirming engine 220, and the navigating engine 222 may be implemented in one or more computing systems and/or devices. In some instances, one or more of the acquiring engine 216, the selecting engine 218, the confirming engine 220, and the navigating engine 222 may be combined or integrated into a single processor, and some or all functions performed by one or more of the acquiring engine 216, the selecting engine 218, the confirming engine 220, and the navigating engine 222 may not be spatially separated, but instead may be performed by a common processor. The environment 200 may also include the one or more servers 230 accessible to the computing system 212. The one or more servers 230 may store pictorial and map data 232 from the vehicle 202, satellite map data 234 from one or more satellite maps, other vehicle data 236 from one or more sensors of another vehicle 240, and/or road sensor data 238 from one or more road sensors such as sensors on traffic lights. In some embodiments, the one or more servers 230 may integrate data from different sensors. In other embodiments, the one or more servers 230 may keep the data from the different sensors separate. The one or more servers 230 may be accessible to the computing system 212 either directly or over the network 250. In some embodiments, the one or more servers 230 may store data that may be accessed by the process engine 214 to provide the various features described herein. In some instances, the one or more servers 230 may include federated data stores, databases, or any other type of data source from which data may be stored and retrieved, for example. In some implementations, the one or more servers 230 may include various types of data sets on which determinations of accuracy or consistency with other information can be made. In general, a user operating a computing device can interact with the computing system 212 over the network 250, for example, through one or more graphical user interfaces and/or application programming interfaces.

The acquiring engine 216 may be configured to obtain sensor data, for example, using the one or more sensors as described with respect to vehicle 100, or from the one or more servers 230. The acquiring engine 216 may continuously obtain the sensor data or obtain the sensor data at discrete time intervals. The acquiring engine 216 may increase a sampling rate of obtaining the sensor data in response to determining that one or more parameters of the obtained sensor data are outside a range. The acquiring engine 216 may utilize object detection and tracking algorithms. The obtained sensor data may comprise video, pictorial or image data of an interior of the vehicle 202, an exterior of the vehicle 202, and/or an environment surrounding the vehicle 202, captured in either real-time or with a time delay. The obtained sensor data may include data 241 and data 242 comprising video, audio, and/or pictorial data of the interior of the vehicle 202. The data 241 and the data 242 may comprise a 360-degree panoramic image or video of the interior of the vehicle 202. The acquiring engine 216 may further acquire vehicle characteristics such as a temperature of the interior of the vehicle 202, a velocity of the vehicle 202, an acceleration of the vehicle 202, and a current fragrance of the interior of the vehicle 202. The obtained sensor data may further comprise timestamp data indicating a time of capture of the sensor data. The obtained sensor data may include information of road conditions or traffic conditions, (e.g., traffic accident, traffic congestion, or road failure, construction, detour, road block, bumpy road, or an additional road sign), environment conditions or weather conditions (e.g., fire, explosion, flood, or earthquake, pollution, smog, tornado, monsoon), health conditions (e.g., stroke or heart attack of a person) or other emergencies (e.g., robbery or shooting). The obtained sensor data may include an image captured from the one or more sensors, or one or more specific features (such as other vehicles, trees, road, grass, landmarks, people, inanimate objects) extracted from the image. The one or more sensors of the acquiring engine 216 may al so detect vehicle speed, vehicle direction, vehicle acceleration, vehicle rotation, and/or vehicle location. The acquiring engine 216 may be completely or partially turned on when the vehicle 202 is powered off in order to detect potential hazards or conditions even when the vehicle is not on. The acquiring engine 216 may include an object detection system that operates while the vehicle 202 is turned off to detect stationary objects or entities or moving objects, features, or entities. When the vehicle is not on and the acquiring engine 216 is partially turned off, sensor data may instead be obtained from the server 230. The sensor data may include the satellite map data 234, the other vehicle data 236, and the road sensor data 238.

In some embodiments, the selecting engine 218 may receive one or more ride requests for ridesharing from one or more users, via the device 231 and/or the device 233. In some embodiments, the device 231 and the device 233 may correspond to different users; for example, one user may make a ride request for ridesharing from the device 231, and another user may make a ride request for ridesharing from the device 233. In some embodiments, the selecting engine 218 may be configured to receive respective preferences from each of the one or more users. In some embodiments, the preferences include an amount of leg room, a material of upholstery, such as a type of material used in seating, a temperature of the interior of the vehicle 202, a smell of the interior of the vehicle 202, a type of fragrance in the interior of the vehicle 202, whether smoking is permitted in the vehicle 202, and/or driving preferences such as a driving manner of the vehicle 202, a cruising velocity of the vehicle 202, such as, that on a highway, and an acceleration of the vehicle 202.

In some embodiments, the selecting engine 218 may be configured to select one or more ride requests of users requesting a ridesharing or robotaxi service, based on the respective preferences. In some embodiments, the selecting engine 218 may rank each of the one or more ride requests in an order starting from a closest match between the respective preferences and characteristics of the vehicle. In some examples, the selecting engine 218 may be configured to select one ride request from a user having preferences that match most closely with the characteristics of the vehicle 202. In some embodiments, the characteristics of the vehicle 202 may correspond to the preferences from each of the one or more users. The characteristics of the vehicle 202 may include, driving characteristics of the vehicle 202 comprising any of: a cruising velocity of the vehicle, an acceleration rate of the vehicle, and a driving style or driving manner of the vehicle. The characteristics of the vehicle 202 may comprise characteristics of the interior of the vehicle 202, which may include any of: a material of upholstery, an amount of leg room, a temperature of the interior of the vehicle 202, and a smell or fragrance of the interior of the vehicle 202. In some examples, the selecting engine 218 may be configured to select ride requests from users having preferences that match most closely with characteristics of the vehicle 202. In some examples, the selecting engine 218 may be configured to select ride requests from users having preferences that are sufficiently similar to the characteristics of the vehicle 202, such that none of the preferences differ from the characteristics of the vehicle 202 by more than a threshold amount and/or an overall difference of all of the preferences do not differ from the characteristics of the vehicle 202 by more than a threshold amount. In some embodiments, the selecting engine 218 may select one or more ride requests based on a similarity between the respective preferences of each user and the characteristics of the vehicle 202, and/or a distance from the vehicle 202 to each user, an estimated time from the vehicle 202 to each user, a distance of a route of the ride request for each user, an estimated time duration of the route of the ride request for each user, and/or one or more terrains, for example, of roads traversed, of the route.

In some embodiments, one or some of the preferences or criteria for selection may have a higher priority or priorities than other preferences, so that the preferences or criteria that have a higher priority or priorities have greater weight when being considered during the selection of a ride request of a user. For example, the criterion of one or more terrains traversed of the route may have a highest priority, because if the vehicle 202 is not equipped to travel through a specified terrain such as a mountainous terrain, then the vehicle 202 automatically disqualifies a user requesting travel through the specified terrain. In some examples, preferences of the interior of the vehicle 202 (leg room, a type of material used in seating, a temperature of the interior of the vehicle 202, a smell of the interior of the vehicle 202, a type of fragrance in the interior of the vehicle 202, whether smoking is permitted) may have higher priority than driving preferences (driving manner, cruising velocity, acceleration). In some embodiments, driving preferences may have higher priority than preferences of the interior of the vehicle 202. In some embodiments, a distance from the vehicle 202 to each user, an estimated time from the vehicle 202 to each user, may have a lowest priority.

In some embodiments, the confirming engine 220 may notify the user, for example, via the device 231, of the selecting of the ride request. The confirming engine 220 may send at least one of the images or videos 241 and 242 of the interior of the vehicle 202 to the user, for example, via the device 231. In some embodiments, the confirming engine 220 may further send the characteristics of the vehicle 202, including the characteristics of the interior of the vehicle 202, driving characteristics, a type of vehicle (e.g., small car, sedan, convertible, truck, minivan, SUV, van, limousine), and a maximum grade of a road the vehicle 202 is equipped to drive in. The confirming engine 220 may, in response to sending at least one of the images or videos 241 and 242 of the interior of the vehicle 202, and/or the characteristics of the vehicle 202, determine whether the user confirms the ride request. If the user does not confirm the ride request, the selecting engine 218 may select another ride request. The selecting of another ride request, by the selecting engine 218, may be based on a closest match, among the remaining ride requests, between the respective preferences and characteristics of the vehicle 202. The preferences may comprise driving preferences and preferences of the interior of the vehicle 202. Likewise, the characteristics may comprise driving characteristics of the vehicle 202 and characteristics of the interior of the vehicle 202. In some examples, the selecting engine 218 may select a ride request of a user, among the remaining ride requests, having preferences that most closely match with the characteristics of the vehicle, and repeat the process again. In some embodiments, the navigating engine 222 may, in response to determining that the user confirms the ride request, select a route to the user and drive to the user according to the route.

Figure 2B:
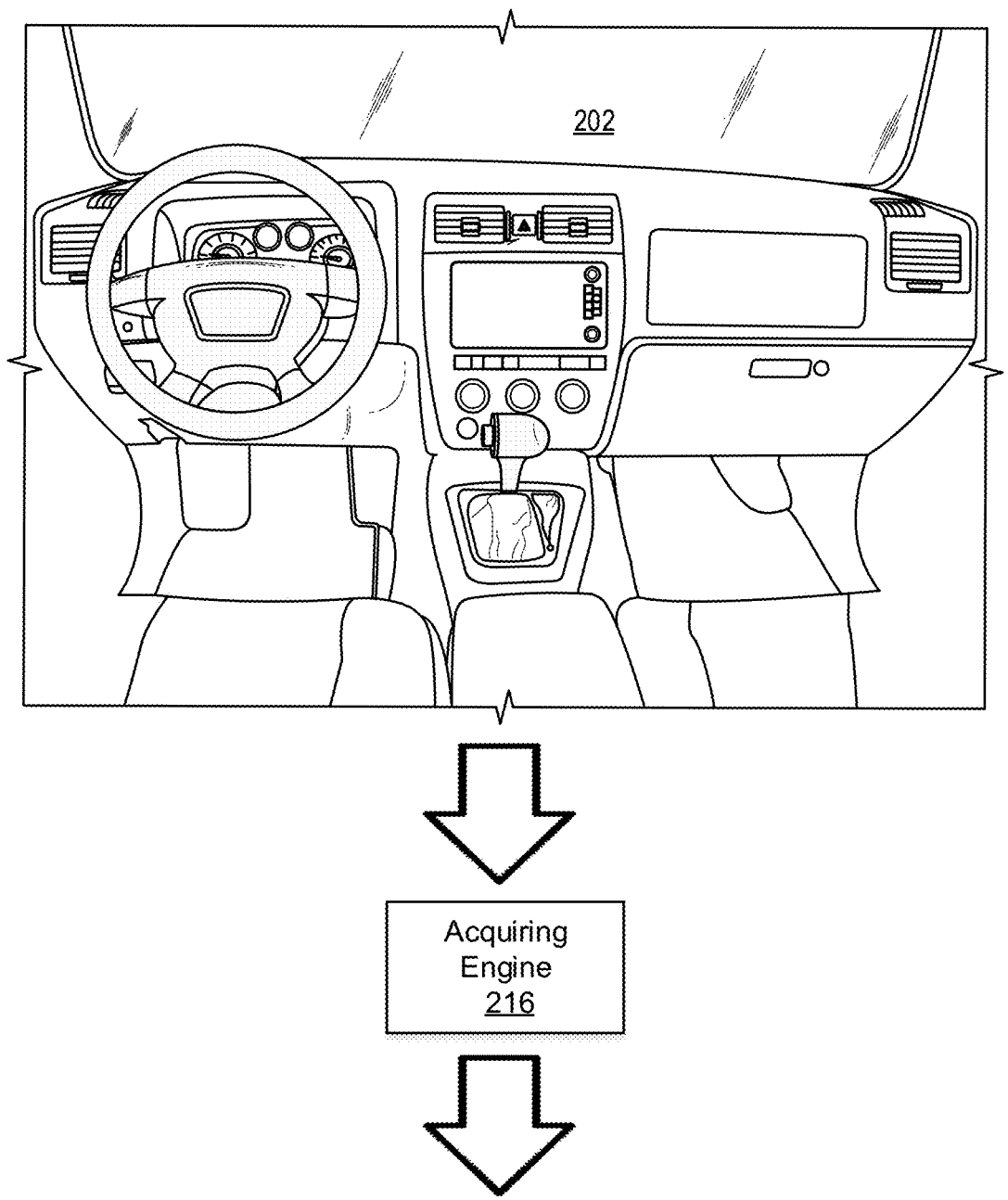
FIGS. 2B-2F illustrate example operations of a computing system, for example, including an acquiring engine, selecting engine, confirming engine, and navigating engine, according to embodiments of the present disclosure.
Figure 2B:
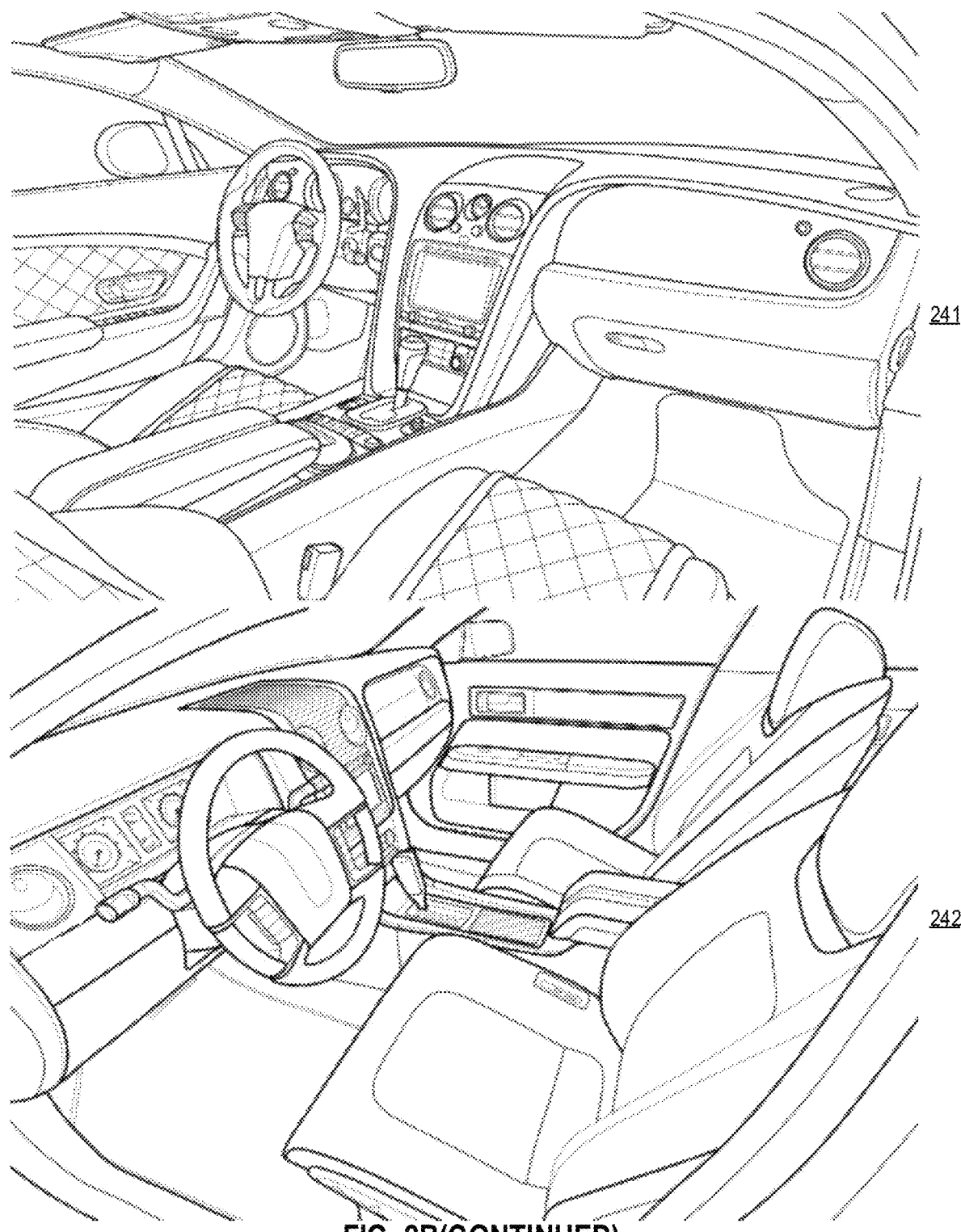

FIG. 2B illustrates an example operation of a computing system, for example, of an acquiring engine such as acquiring engine 216, from FIG. 2A. In FIG. 2B, the acquiring engine 216 of the vehicle 202 may be configured to acquire sensor data including the data 241 and the data 242 comprising video, audio, and/or pictorial data of the interior of the vehicle 202. The data 241 and the data 242 may comprise a 360-degree panoramic image or video of the interior of the vehicle 202, and/or may encompass different views of the interior of the vehicle 202.

Figure 2C:
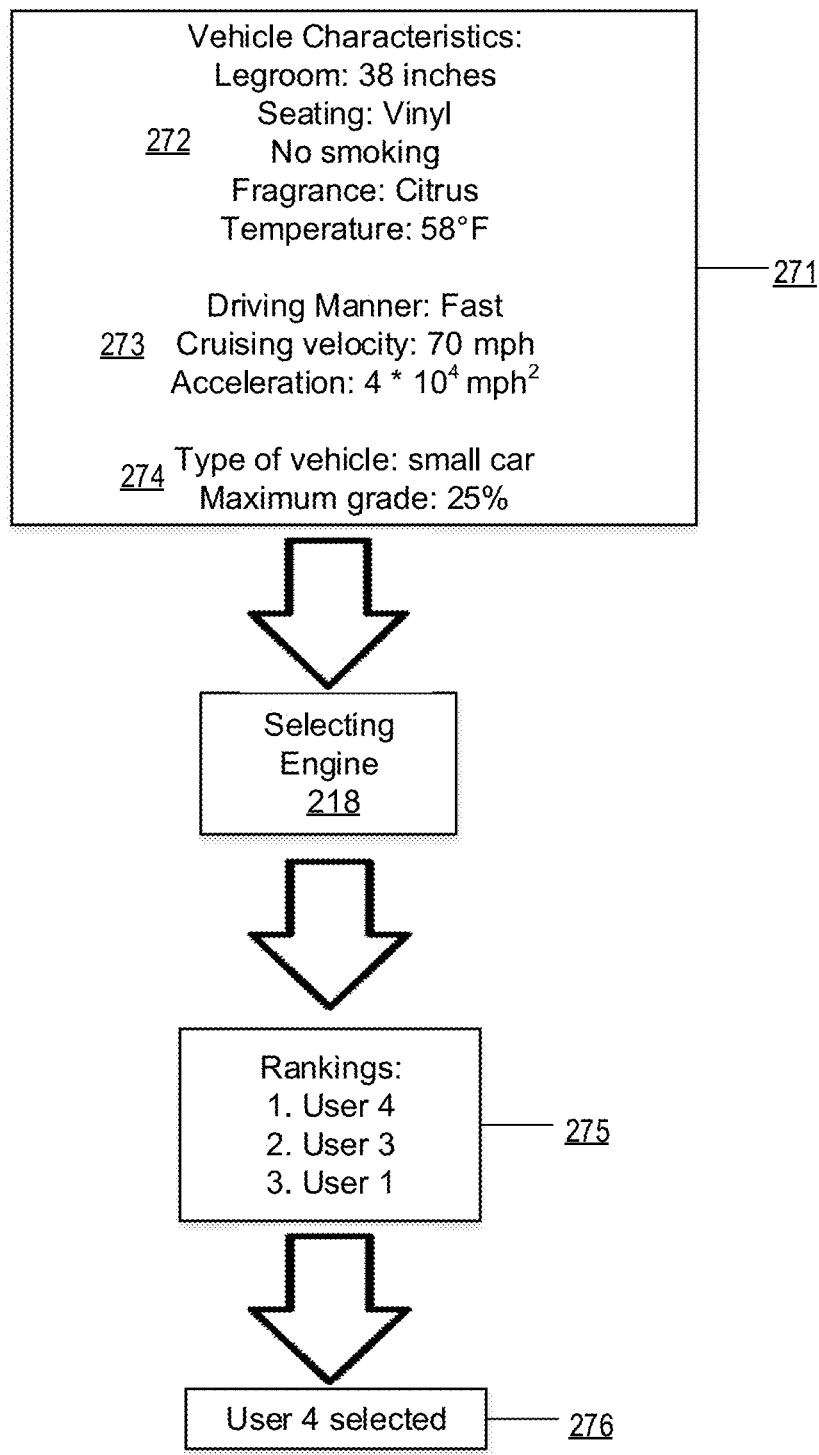

FIG. 2C illustrates an example operation of a computing system, for example, of a selecting engine such as selecting engine 218, from FIG. 2A. In some embodiments, the selecting engine 218 may be configured to receive user characteristics 251, 256, 261, and 266 of each user that requests a ridesharing or robotaxi service. The selecting engine 218 may receive the user characteristics 251, 256, 261, and 266 from the one or more servers 230. In some examples, the user characteristics 251, 256, 261, and 266 may correspond to a first user (e.g. User 1), a second user (e.g. User 2), a third user (e.g. User 3), and a fourth user (e.g. User 4). In some examples, the user characteristics 251 may be acquired via the device 231, the user characteristics 256 may be acquired via the device 233, and the user characteristics 261 and 266 may be acquired via two other devices (not shown). The user characteristics 251 of user 1 may comprise preferences 252 of the interior of the vehicle 202, which may include an amount of legroom, a material used for upholstery and/or seating, a fragrance of the interior, a temperature or temperature range of the interior, and whether smoking is permitted in the interior. The user characteristics 251 may comprise driving preferences 253 which may include a driving manner, a desired cruising velocity, and a desired acceleration or desired acceleration range of the user 1. The user characteristics 251 may comprise user location information 254 comprising a distance from the vehicle 202 to the user and an estimated time to arrive at a location of the user 1. The user characteristics 251 may comprise information 255 of a route of the user 1, including a distance of the route, an estimated time of the route, and a terrain of roads travelled during the route. The user characteristics 256 of user 2 may comprise preferences 257 of the interior of the vehicle 202, which may include an amount of legroom, a material used for upholstery and/or seating, a fragrance of the interior, a temperature or temperature range of the interior, and whether smoking is permitted in the interior. The user characteristics 256 may comprise driving preferences 258 which may include a driving manner, a desired cruising velocity, and a desired acceleration or desired acceleration range of the user 2. The user characteristics 256 may comprise user location information 259 comprising a distance from the vehicle 202 to the user and an estimated time to arrive at a location of the user 2. The user characteristics 256 may comprise information 260 of a route of the user 2, including a distance of the route, an estimated time of the route, and a terrain of roads travelled during the route. The user characteristics 261 of user 3 may comprise preferences 262 of the interior of the vehicle 202, which may include an amount of legroom, a material used for upholstery and/or seating, a fragrance of the interior, a temperature or temperature range of the interior, and whether smoking is permitted in the interior. The user characteristics 261 may comprise driving preferences 263 which may include a driving manner, a desired cruising velocity, and a desired acceleration or desired acceleration range of the user 3. The user characteristics 261 may comprise user location information 264 comprising a distance from the vehicle 202 to the user and an estimated time to arrive at a location of the user 3. The user characteristics 261 may comprise information 265 of a route of the user 3, including a distance of the route, an estimated time of the route, and a terrain of roads travelled during the route. The user characteristics 266 of user 4 may comprise preferences 267 of the interior of the vehicle 202, which may include an amount of legroom, a material used for upholstery and/or seating, a fragrance of the interior, a temperature or temperature range of the interior, and whether smoking is permitted in the interior. The user characteristics 266 may comprise driving preferences 268 which may include a driving manner, a desired cruising velocity, and a desired acceleration or desired acceleration range of the user 4. The user characteristics 266 may comprise user location information 269 comprising a distance from the vehicle 202 to the user and an estimated time to arrive at a location of the user 4. The user characteristics 266 may comprise information 270 of a route of the user 4, including a distance of the route, an estimated time of the route, and a terrain of roads travelled during the route.

The selecting engine 218 may compare each of the user characteristics 251, 256, 261, and 266 with vehicle characteristics 271. The vehicle characteristics 271 may comprise characteristics 272 of the interior of the vehicle 202, which may include an amount of legroom, a material used for upholstery and/or seating, a fragrance of the interior, a temperature or temperature range of the interior, and whether smoking is permitted in the interior. The vehicle characteristics 271 may comprise driving characteristics 273 which may include a driving manner, a cruising velocity, such as a cruising velocity on a highway, and an acceleration or acceleration range of the vehicle 202. The vehicle characteristics 271 may comprise vehicle information 274, which may include a type of the vehicle 202 (e.g., small car, sedan, convertible, truck, minivan, SUV, van, limousine), and a maximum grade of a road the vehicle 202 is equipped to drive in. The selecting engine 218 may generate rankings 275 by ranking each of the ride requests based on a degree of matching between the respective user characteristics 251, 256, 261, and 266 of each of the users corresponding to the ride requests and the vehicle characteristics 271. The selecting engine 218 may rank each of the ride requests in an order starting from a closest match. The selecting engine 218 may rank only the ride requests that can practically be implemented by the vehicle 202. For example, if the vehicle information 274 indicates that a maximum grade the vehicle 202 can travel through is 25%, any ride request that includes a vehicle grade exceeding 25% cannot practically be implemented by the vehicle 202 and therefore may not be ranked.

In some embodiments, the rankings 275 may be generated by comparing the preferences 252, 257, 262, and 267 of the interior of the vehicle 202 to the vehicle characteristics 272 of the interior of the vehicle 202, comparing the driving preferences 253, 258, 263, and 268 to the driving characteristics 273 of the vehicle 202, and further based on the user location information 254, 259, 264, and 269, and the information 255, 260, 265, and 270 of a route of each user. In some examples, the rankings 275 may be generated by one or more algorithms. In some embodiments, a degree of matching between each of the preferences 252, 257, 262, and 267 of the interior of the vehicle 202 and the vehicle characteristics 272 of the interior of the vehicle 202, may have a higher priority or greater weight than a degree of matching between each of the driving preferences 253, 258, 263, and 268 and the driving characteristics 273 of the vehicle 202, in selecting a ride request. In some embodiments, a degree of matching between each of the driving preferences 253, 258, 263, and 268 and the driving characteristics 273 of the vehicle 202, may have a higher priority or greater weight than a degree of matching between each of the preferences 252, 257, 262, and 267 of the interior of the vehicle 202 and the vehicle characteristics 272 of the interior of the vehicle 202. In some embodiments, the user location information 254, 259, 264, and 269 of each user may have a lowest priority or lowest weight in selecting a ride request. In some embodiments, the route information 255, 260, 265, and 270 of a route of each user may have a lowest priority or lowest weight in selecting a ride request. In some embodiments, a degree of matching between certain components of the preferences 252, 257, 262, and 267 of the interior of the vehicle 202 and respective components of the vehicle characteristics 272 of the interior of the vehicle 202 may have higher priorities or greater weights compared to other components. In some examples, a degree of matching between a desired amount of legroom of each user with an amount of legroom in the vehicle 202 may have a greater weight compared to a degree of matching between a desired fragrance of each user with a fragrance in the vehicle 202.

In generating the rankings 275, the selecting engine 218 ranked user 1 as first because the preferences 267 of the user regarding the interior of the vehicle 202 that match the characteristics 272 of the interior of the vehicle 202 include legroom, seating, smoking preferences, and temperature, while the driving preferences 268 of the user that match the driving characteristics 273 of the vehicle 202 include an acceleration. Moreover, the terrain of the route of user 4, from the information 270 of a route, indicates a 10% grade which is within the allowable grade of 25% of the vehicle 202, as indicated from the vehicle information 274. The selecting engine 218 ranked user 3 ahead of user 1 because the legroom preference of user 3, as indicated in the preferences 262 of the interior of the vehicle 202, more closely matches the characteristics 272 of the interior of the vehicle 202, compared to the legroom preference of user 1, as indicated in the preferences 262 of the interior of the vehicle 202. An additional reason for the selecting engine 218 ranking user 3 ahead of user 1 is that the acceleration preference of user 3, as indicated in the driving preferences 263, more closely matches the characteristics 273 of the interior of the vehicle 202, compared to the acceleration preference of user 1, as indicated in the driving preferences 253. The selecting engine 218 did not include user 2 as part of the rankings 275 because the terrain of the route of user 2 was 30%, as indicated by the route information 260 of user 2, which exceeds the maximum grade, 25%, of the vehicle 202, as indicated by the vehicle information 274. The selecting engine 218 may generate a selection of one or more users. In the example of FIG. 2C, the selecting engine 218 may generate a selection 276 of user 4.

Figure 2D:
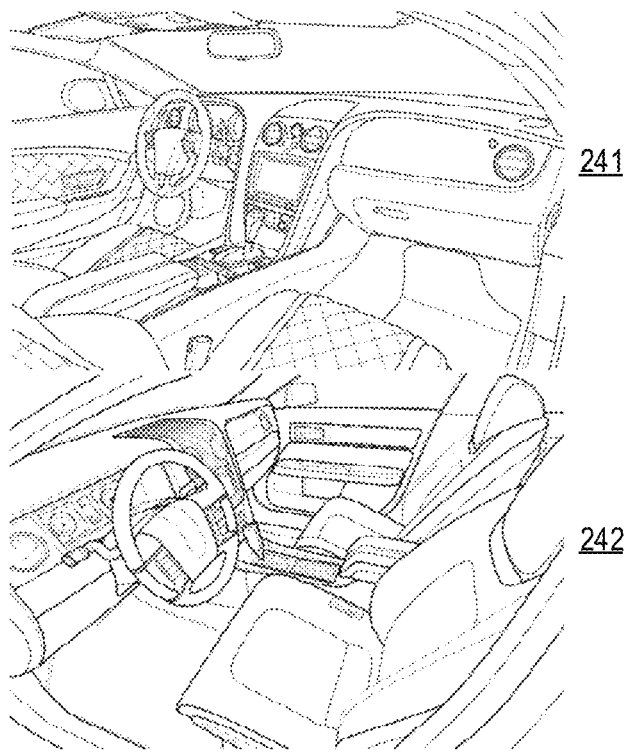
Figure 2D:
Figure 2D:
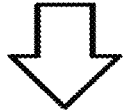
Figure 2D:
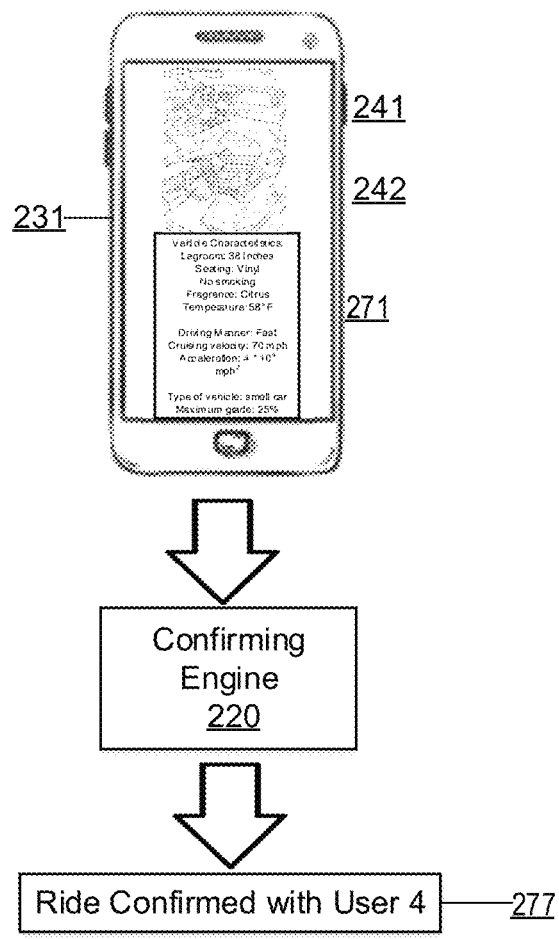
Figure 2E:
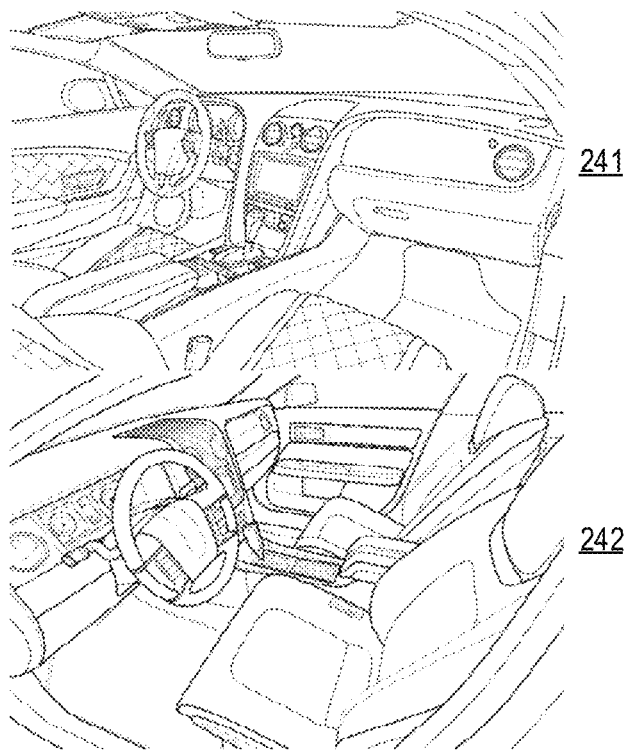
Figure 2E:
Figure 2E:
Figure 2E:
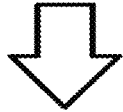
Figure 2E:
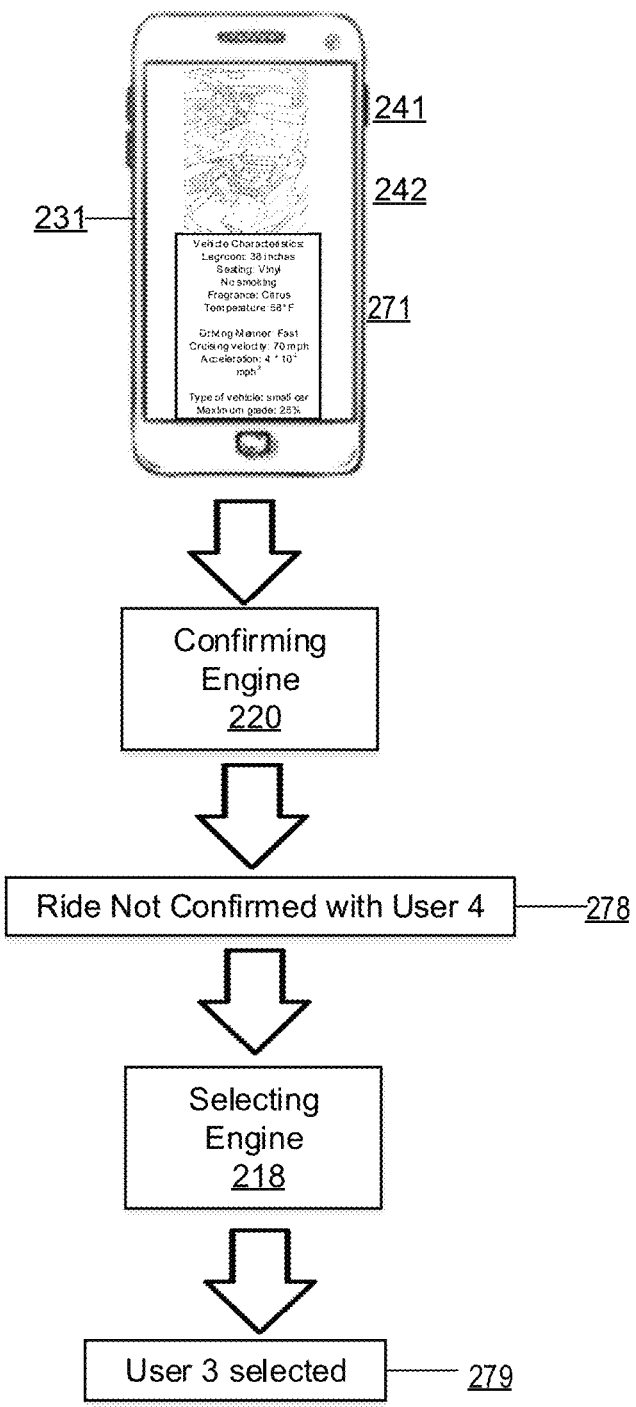

FIGS. 2D-2E illustrate an example operation of a computing system, for example, of a confirming engine such as confirming engine 220, from FIG. 2A. In some embodiments, the confirming engine 220 may obtain the images or the videos 241 and/or 242, from the acquiring engine 216, and vehicle characteristics 271, for example, from the acquiring engine 216 or the one or more servers 230. The confirming engine 220 may send any of the images or the videos 241 and/or 242, and the vehicle characteristics 271, to the user 1. For example, the images or the videos 241 and/or 242, and the vehicle characteristics 271 may be sent by the confirming engine 220 to be displayed on a screen of the device 231 corresponding to user 1. The user 1 may send to the confirming engine 220, for example, via the device 231, a confirmation 277 that the user 1 confirms the selection of the vehicle 202. In FIG. 2E, the user 1 may alternatively send to the confirming engine 220, for example, via the device 231, a rejection 278 that the user 1 does not wish to choose the vehicle 202. In some embodiments, the rejection 278 may comprise an indication that the user 1 does not choose the vehicle 202, an indication that the user chooses another vehicle, or an absence of a confirmation. In response to the rejection 218, the confirming engine 220 may communicate with the selecting engine 218, which may select another user. For example, the selecting engine 218 may select a user having a highest rank in the rankings 275, out of the remaining ride requests. In the example of FIG. 2E, the selecting engine 218 may select user 3.

Figure 2F:
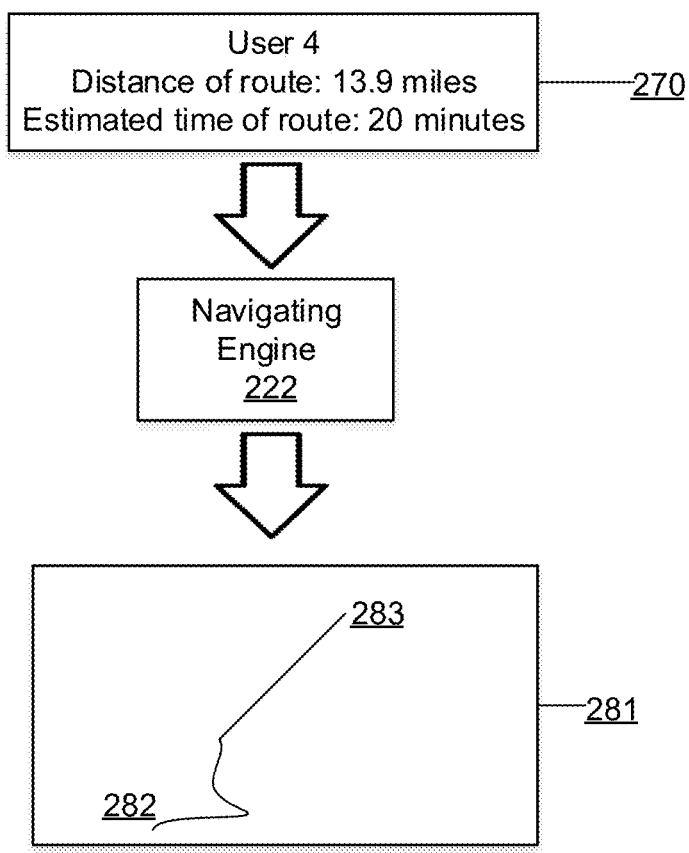

FIG. 2F illustrates an example operation of a computing system, for example, of a navigating engine such as navigating engine 222, from FIG. 2A. In some embodiments, the navigating engine 222 may route information 270 of the user 4, for example, from a device belonging to the user 4. The navigating engine may plan a route 281 having a startpoint 282, where user 4 may be picked up, and an endpoint 283, which may be a destination.

Figure 3:
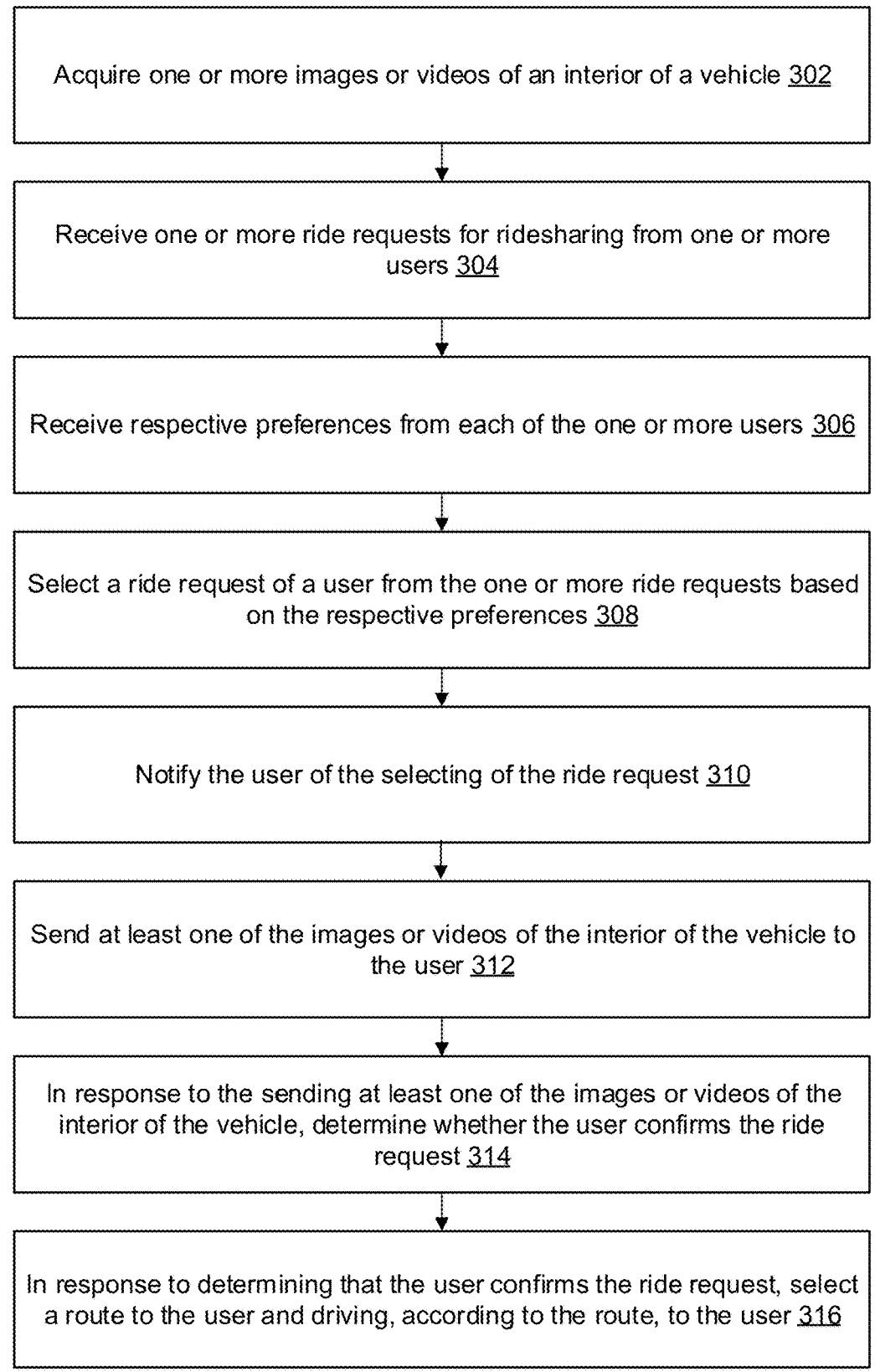
FIG. 3 illustrates a flowchart of an example of a method of coordinating or controlling a ridesharing or robotaxi service, according to some embodiments.

FIG. 3 illustrates a flowchart of a method to determine and select a stop point according to some embodiments. In this and other flowcharts, the flowchart 300 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity. The description from other FIGS. may also be applicable to FIG. 3.

In step 302, one or more sensors may acquire one or more images or videos of an interior of a vehicle. In step 304, one or more processors may receive one or more ride requests for ridesharing from one or more users. In step 306, the one or more processors may receive respective preferences from each of the one or more users. In step 308, the one or more processors may select a ride request of a user from the one or more ride requests based on the respective preferences. In step 310, the one or more processors may notify the user of the selecting of the ride request. In step 312, the one or more processors may send at least one of the images or videos of the interior of the vehicle to the user. In step 314, the one or more processors may, In response to the sending at least one of the images or videos of the interior of the vehicle, determine whether the user confirms the ride request. In step 316, the one or more processors may, in response to determining that the user confirms the ride request, select a route to the user and driving, according to the route, to the user.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 4:
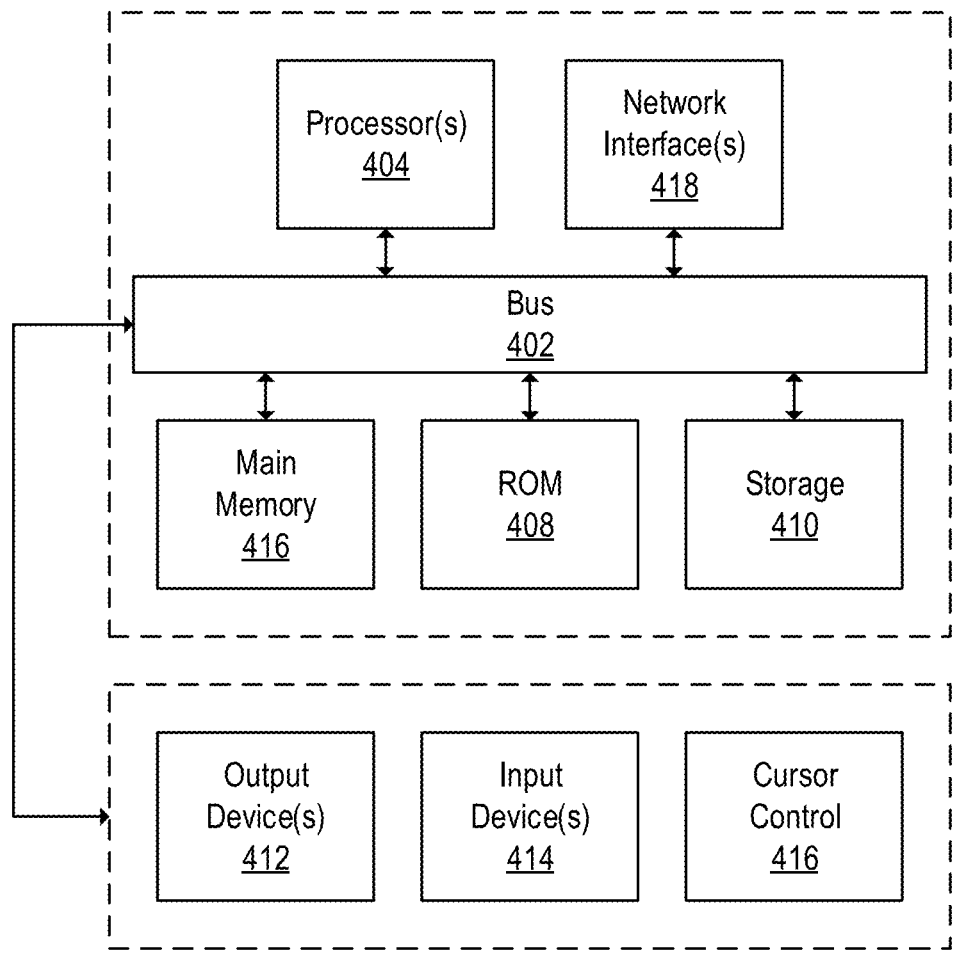
FIG. 4 is a diagram of an example computer system for implementing the features disclosed herein.

FIG. 4 is a block diagram that illustrates a computer system 400 upon which any of the embodiments described herein may be implemented. The computer system 400 includes a bus 402 or other communication mechanism for communicating information, one or more hardware processors 404 coupled with bus 402 for processing information. Hardware processor(s) 404 may be, for example, one or more general purpose microprocessors.

The computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

The computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

The computer system 400 may be coupled via bus 402 to output device(s) 412, such as a cathode ray tube (CRT) or LCD display (or touch screen), for displaying information to a computer user. Input device(s) 414, including alphanumeric and other keys, are coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may retrieves and executes the instructions. The instructions received by main memory 406 may optionally be stored on storage device 410 either before or after execution by processor 404.

The computer system 400 also includes a communication interface 418 coupled to bus 402. Communication interface 418 provides a two-way data communication coupling to one or more network links that are connected to one or more local networks. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN (or WAN component to communicated with a WAN). Wireless links may also be implemented. In any such implementation, communication interface 418 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 418, which carry the digital data to and from computer system 400, are example forms of transmission media.

The computer system 400 can send messages and receive data, including program code, through the network(s), network link and communication interface 418. In the Internet example, a server might transmit a requested code for an application program through the Internet, the ISP, the local network and the communication interface 418.

The received code may be executed by processor 404 as it is received, and/or stored in storage device 410, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which may include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof Engines, Components, and Logic Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

For example, "is to be" could mean, "should be," "needs to be," "is required to be," or "is desired to be," in some embodiments.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The foregoing description of the present invention(s) have been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system of a vehicle comprising:
   one or more sensors configured to acquire one or more images or videos of an interior of the vehicle;
   one or more processors; and
   a memory storing instructions that, when executed by the one or more processors, causes the system to perform:
   receiving one or more ride requests for ridesharing from one or more users;
   receiving respective preferences from each of the one or more users, wherein the preferences comprise a road grade that a vehicle is equipped to traverse;
   selecting a ride request of a user from the one or more ride requests based on the respective preferences and based on a comparison of the respective preferences to one or more characteristics of the vehicle, wherein the preferences further comprise driving characteristics and interior characteristics, the driving characteristics comprising a driving manner, a desired cruising velocity, or a desired acceleration or desired acceleration range, and the interior characteristics comprise an amount of legroom, a material used for upholstery or seating, a fragrance of the interior, a temperature or temperature range of the interior, or whether smoking is permitted in the interior, and the selecting of the ride request of a user comprises weighting at least some of the driving characteristics more heavily compared to at least some of the interior characteristics;
   notifying the user of the selecting of the ride request;
   sending at least one of the images or videos of the interior of the vehicle to the user;
   in response to the sending at least one of the images or videos of the interior of the vehicle, determining whether the user confirms the ride request; and
   in response to determining that the user confirms the ride request, selecting a route to the user and driving, according to the route, to the user.

2. The system of claim 1, wherein the preferences comprise location characteristics, the location characteristics comprising a distance from the vehicle to the user and an estimated time to arrive at the user.

3. The system of claim 2, wherein the selecting of the ride request of a user comprises weighting at least some of the driving characteristics more heavily compared to at least some of the location characteristics.

4. A method implemented by a computing system including one or more sensors, one or more processors and storage media storing machine-readable instructions, the method comprising:
acquiring one or more images or videos, using the one or more sensors, of an interior of the vehicle;
receiving one or more ride requests for ridesharing from one or more users;
receiving respective preferences from each of the one or more users, wherein the preferences comprise a road grade that a vehicle is equipped to traverse;
selecting a ride request of a user from the one or more ride requests based on the respective preferences and based on a comparison of the respective preferences to one or more characteristics of the vehicle, wherein the preferences further comprise location characteristics and driving characteristics, the location characteristics comprising a distance from the vehicle to the user or an estimated time to arrive at the user, and the driving characteristics comprising a driving manner, a desired cruising velocity, or a desired acceleration or desired acceleration range, and the selecting of the ride request of a user comprises weighting at least some of the driving characteristics more heavily compared to at least some of the location characteristics;
notifying the user of the selecting of the ride request;
sending at least one of the images or videos of the interior of the vehicle to the user;
in response to the sending at least one of the images or videos of the interior of the vehicle, determining whether the user confirms the ride request; and
in response to determining that the user confirms the ride request, selecting a route to the user and driving, according to the route, to the user.

5. The method of claim 4, wherein the preferences further comprise a material of upholstery or seating within an interior of the vehicle.

6. The method of claim 4, wherein the preferences comprise a smoking or a non-smoking preference within the vehicle and a desired fragrance within an interior of the vehicle.

7. The method of claim 4, wherein the preferences comprise interior characteristics, the interior characteristics comprise an amount of legroom, a material used for upholstery or seating, a fragrance of the interior, a temperature or temperature range of the interior, and whether smoking is permitted in the interior.

8. The method of claim 7, wherein the selecting of the ride request of a user comprises weighting at least some of the driving characteristics more heavily compared to at least some of the interior characteristics.

9. The method of claim 4, wherein the preferences comprise a desired amount of legroom and a fragrance in the vehicle, and the selecting of the ride request of a user comprises weighting the desired amount of legroom more heavily compared to the fragrance.

10. The method of claim 4, wherein the preferences comprise a desired amount of legroom and a smoking or a non-smoking preference within the vehicle, and the selecting of the ride request of a user comprises weighting the desired amount of legroom more heavily compared to the smoking or the non-smoking preference.

11. The method of claim 4, wherein the preferences comprise a material used for upholstery or seating and a smoking or a non-smoking preference within the vehicle, and the selecting of the ride request of a user comprises weighting the material used for upholstery or seating more heavily compared to the smoking or the non-smoking preference within the vehicle.

12. A system of a vehicle comprising:
one or more sensors configured to acquire one or more images or videos of an interior of the vehicle;
one or more processors; and
a memory storing instructions that, when executed by the one or more processors, causes the system to perform:
receiving one or more ride requests for ridesharing from one or more users;
receiving respective preferences from each of the one or more users, wherein the preferences comprise a road grade that a vehicle is equipped to traverse;
selecting a ride request of a user from the one or more ride requests based on the respective preferences and based on a comparison of the respective preferences to one or more characteristics of the vehicle, wherein the preferences further comprise location characteristics and driving characteristics, the location characteristics comprising a distance from the vehicle to the user or an estimated time to arrive at the user, and the driving characteristics comprising a driving manner, a desired cruising velocity, or a desired acceleration or desired acceleration range, and the selecting of the ride request of a user comprises weighting at least some of the driving characteristics more heavily compared to at least some of the location characteristics;
notifying the user of the selecting of the ride request;
sending at least one of the images or videos of the interior of the vehicle to the user;
in response to the sending at least one of the images or videos of the interior of the vehicle, determining whether the user confirms the ride request; and
in response to determining that the user confirms the ride request, selecting a route to the user and driving, according to the route, to the user.

* * * * *